United States Patent
Matsuzaki et al.

(10) Patent No.: US 9,543,671 B2
(45) Date of Patent: Jan. 10, 2017

(54) TERMINAL BLOCK

(71) Applicant: NISSAN MOTOR CO., LTD., Yokohama-shi, Kanagawa (JP)

(72) Inventors: Hirokazu Matsuzaki, Yamato (JP); Takenari Okuyama, Zama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/351,666

(22) PCT Filed: Oct. 3, 2012

(86) PCT No.: PCT/JP2012/075724
§ 371 (c)(1),
(2) Date: Apr. 14, 2014

(87) PCT Pub. No.: WO2013/058116
PCT Pub. Date: Apr. 25, 2013

(65) Prior Publication Data
US 2014/0329417 A1 Nov. 6, 2014

(30) Foreign Application Priority Data
Oct. 17, 2011 (JP) .................................. 2011-227753

(51) Int. Cl.
*H01R 9/22* (2006.01)
*H01R 9/24* (2006.01)
(Continued)

(52) U.S. Cl.
CPC .............. *H01R 9/24* (2013.01); *H01R 13/405* (2013.01); *H01R 13/514* (2013.01); *H02K 5/225* (2013.01); *H01R 4/30* (2013.01)

(58) Field of Classification Search
CPC ........... H01R 9/22; H01R 9/24; H01R 13/405; H01R 13/514; H01R 4/30; H02K 5/22
(Continued)

(56) References Cited

U.S. PATENT DOCUMENTS 4,630,882 A * 12/1986 Naylor ...................... H01R 9/24
439/444
6,224,430 B1 * 5/2001 Kusuda ................ H01R 12/515
439/709
(Continued)

FOREIGN PATENT DOCUMENTS

JP 63-310344 A 12/1988
JP 2-9433 B2 3/1990
(Continued)

OTHER PUBLICATIONS

Hiroshi, Orsuka. Conductive Member Fastening Structure. Oct. 12, 2006. JP2008098007 Description. Machine Translation.*
(Continued)

*Primary Examiner* — Amy Cohen Johnson
*Assistant Examiner* — Milagros Jeancharles
(74) *Attorney, Agent, or Firm* — Foley & Lardner LLP

(57) ABSTRACT

A terminal block for electrically connecting a plurality of first wires connected to an electric motor and a plurality of second wires connected to a power conversion device for supplying drive power of the electric motor includes a case, a plurality of terminals housed in the case and configured to connect the plurality of first wires and the plurality of second wires to each other, a partition wall provided between the plurality of terminals to electrically isolate the plurality of terminals from each other, and plate-like members provided between the partition wall and the terminals and made of a material with a higher elasticity than the case and the partition wall.

17 Claims, 6 Drawing Sheets

(51) Int. Cl.
*H02K 5/22* (2006.01)
*H01R 13/514* (2006.01)
*H01R 13/405* (2006.01)
*H01R 4/30* (2006.01)

(58) Field of Classification Search
USPC ..... 310/71; 29/264; 439/487, 709, 715, 587, 439/877, 65, 66, 676, 83, 71, 722, 76.2, 439/801, 720, 797, 798, 792, 456, 564
See application file for complete search history.

(56) References Cited

U.S. PATENT DOCUMENTS

| | | | | |
|---|---|---|---|---|
| 7,373,719 | B2* | 5/2008 | Channell, Sr. | B29C 45/14426 |
| | | | | 264/272.11 |
| 7,559,810 | B1* | 7/2009 | Wu | H01R 4/34 |
| | | | | 439/709 |
| 7,947,332 | B2* | 5/2011 | Takano | B32B 27/04 |
| | | | | 29/829 |
| 8,366,490 | B2* | 2/2013 | Wu | H01R 13/502 |
| | | | | 439/660 |
| 8,622,772 | B2* | 1/2014 | Akuta | H01R 13/405 |
| | | | | 439/722 |
| 2004/0242034 | A1 | 12/2004 | Rinehart et al. | |
| 2012/0225593 | A1* | 9/2012 | Akuta | H01R 13/405 |
| | | | | 439/722 |
| 2013/0252479 | A1* | 9/2013 | Ramey | H02K 5/225 |
| | | | | 439/709 |

FOREIGN PATENT DOCUMENTS

| | | |
|---|---|---|
| JP | 7-22080 A | 1/1995 |
| JP | 11-250960 A | 9/1999 |
| JP | 2008-98007 A | 4/2008 |
| WO | WO 2009/087767 A1 | 7/2009 |

OTHER PUBLICATIONS

Japanese Office Action, Dec. 24, 2014, 3 pages.
European Extended Search Report, Feb. 2, 2015, 7 pages.

* cited by examiner

TERMINAL BLOCK

TECHNICAL FIELD

The present invention relates to a terminal block for connecting wires.

BACKGROUND ART

In an electric motor, a terminal block with a plurality of terminals is used to connect wires connected to a stator winding of each phase and an external power source such as an inverter. Since the terminals need to be insulated from each other, the terminals are generally partitioned by electrically insulating partition plates (hereinafter, insulating plates) made of a resin or the like.

As such a terminal block, JP63-310344A discloses a plastic terminal block integrally molded of an engineering plastic material while including a terminal block and integrally molded with insulating plates for insulating between wires in the terminal block as reinforcement ribs of the terminal box.

SUMMARY OF INVENTION

In the case of molding terminals made of a metal by a resin, thermal stress is created in an insulating plate made of an insulating resin between the terminals due to a temperature change since there is a difference in linear coefficient of expansion between the metal and the resin. Due to the repeat of this thermal stress, the insulating plate may be possibly cracked or damaged, causing a problem of reducing insulation reliability of the insulating plate between the terminals.

The present invention was developed in view of the above problem and aims to provide a terminal block in which terminals are housed in a case made of a resin or the like and which can prevent a reduction in insulation reliability due to thermal stress.

One aspect of the present invention is directed to a terminal block for electrically connecting a plurality of first wires connected to an electric motor and a plurality of second wires connected to a power conversion device for supplying drive power of the electric motor. The terminal block includes a case, a plurality of terminals housed in the case and configured to connect the plurality of first wires and the plurality of second wires to each other, a partition wall provided between the plurality of terminals to electrically isolate the plurality of terminals from each other, and plate-like members provided between the partition wall and the terminals and made of a material with a higher elasticity than the case and the partition wall.

An embodiment and advantages of the present invention are described in detail below with reference to the accompanying drawings.

DESCRIPTION OF EMBODIMENTS

Figure 1:
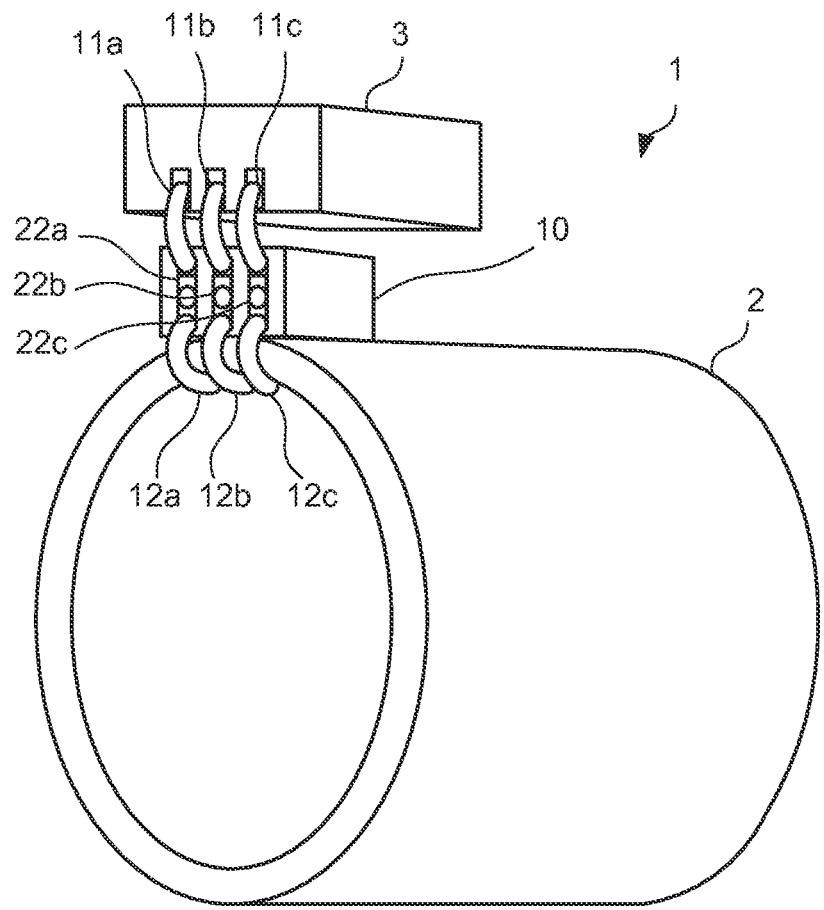
FIG. 1 is a diagram of a driving device including a terminal block of an embodiment of the present invention.

FIG. 1 is a diagram of a driving device 1 including a terminal block 10 of an embodiment of the present invention.

The driving device 1 includes a motor 2, an inverter 3 and the terminal block 10 for electrically connecting the motor 2 and the inverter 3.

The inverter 3 is a power conversion device to which DC power from a DC power source such as an unillustrated battery is input and which supplies power for driving the motor 2 by converting the input DC power into three-phase alternating-current power and supplying it to the motor 2 and receives and supplies regenerative power from the motor 2 to the DC power source.

The motor 2 is an electric motor including, for example, poles of three phases and rotates a rotor by the application of the three-phase alternating-current power from the inverter 3 to a winding of a stator. Further, regenerative power is generated in the stator by the rotation of the rotor and supplied to the inverter side. The rotor is not shown in FIG. 1.

The terminal block 10 connects electrical wires of the motor 2 and the inverter 3.

Specifically, wires 11 (11a, 11b, 11c) are connected to the inverter 3 and wires 12 (12a, 12b, 12c) are connected to the motor 2. The terminal block 10 electrically connects the wires 11 and the wires 12 by placing plate-like terminals connected to the tips of the wires 11 and provided with unillustrated bolt holes and plate-like terminals connected to the tips of the wires 12 and provided with unillustrated bolt holes one over the other with the positions of the bolt holes aligned, inserting unillustrated bolts into the bolt holes and threadably engaging them with terminals 22 (22a, 22b, 22c) to fix the plate-like terminals connected to the wires 11 and the plate-like terminals connected to the wires 12.

The motor 2 generates heat by being driven. Since the motor 2 and the inverter 3 tire connected by the wires 11, 12 with a high thermal conductivity such as copper, the heat generated by the motor 2 may be transferred to the inverter 3 through the wires 11, 12. Since the efficiency of the inverter 3 is reduced due to a temperature increase, the heat from the motor 2 is preferably not transferred. Accordingly, the terminal block 10 has not only a function of connecting the wires 11, 12 between the motor 2 and the inverter 3, but also a function of radiating the heat from the wires 12 due to the heat capacity and thermal conductivity of the terminals 22 to make heat transfer to the side of the wires 11 difficult.

Figure 2A:
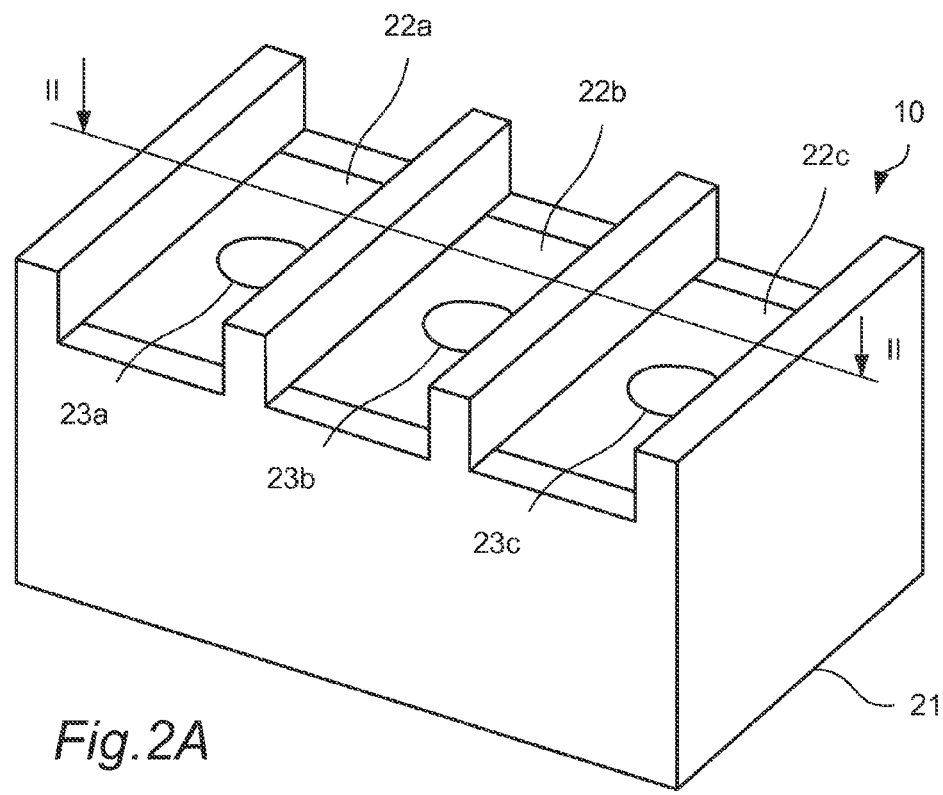
FIG. 2A is a diagram of the terminal block of the embodiment of the present invention.
Figure 2B:
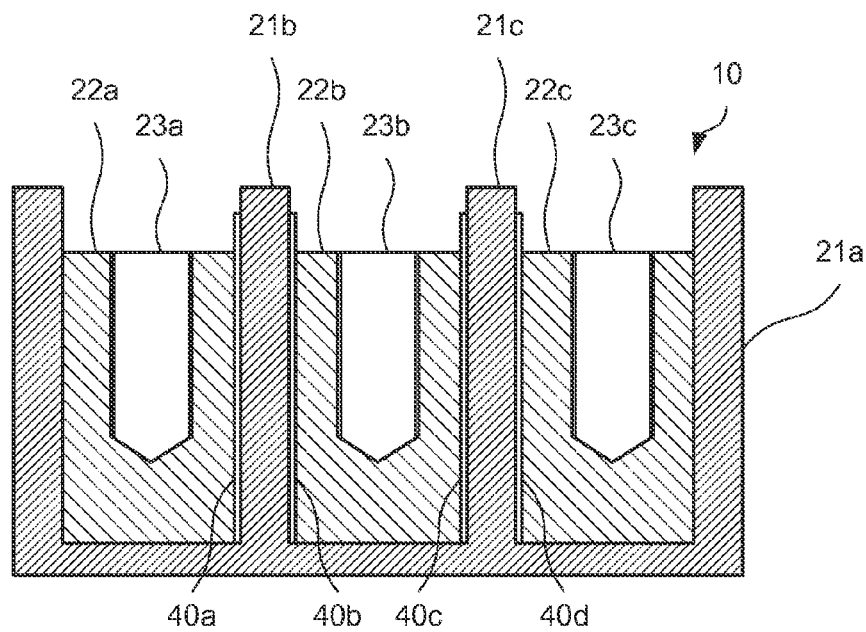
FIG. 2B is a diagram of the terminal block of the embodiment of the present invention.

FIGS. 2A and 2B are diagrams of the terminal block 10 of the present embodiment. FIG. 2A is a perspective view of the terminal block 10 and FIG. 2B is a sectional view of the terminal block 10 along II-II of FIG. 2A. As described above, the wires 11 connected to the inverter 3 and the wires 12 connected to the motor 2 are electrically connected by fixing the plate-like terminals connected to the tips of the wires 11, 12 to the terminals 22 of the terminal block 10 while placing them one over the other. Since a wire connection structure using the terminal block 10 is a structure generally used in connecting a motor 2 and an inverter 3, it is not described in detail. The structure of the terminal block 10 itself, which is a characteristic of the present embodiment, is mainly describe below in detail using the drawings.

The terminal block 10 is configured by housing a plurality of terminals 22a, 22b and 22c made of a metal in a case 21 made of a resin. The case 21 is composed of a box-shaped portion 21a having an upper opening and partition walls 21b, 21c formed of an electrical insulating resin material and configured to isolate the terminals 22 accommodated in the case 21 while insulating them from each other. Electrical insulation is merely written as insulation below.

The terminal 22 is perforated with a bolt hole 23 (23a, 23b, 23c). In the terminal 22, the unillustrated bolt is passed through the bolt hole formed in the unillustrated plate-like terminal provided on an end part of the wire 11 connected to the inverter 3 and the bolt hole formed in the unillustrated plate-like terminal provided on an end part of the wire 12 connected to the motor 2. When the driving device 1 is assembled, the bolt is threadably engaged with the bolt hole 23 to fasten both the plate-like terminals to the terminal 22. In this way, the wires 11, 12 are electrically connected via the plate-like terminals to transmit power between the motor 2 and the inverter 3.

As just described, in the terminal block 10, the wires 11, 12 are electrically connected in the terminals 22 and power of three phases is interchanged between, the motor 2 and the inverter 3.

In the driving device 1 thus configured, the motor 2 generates heat by being driven. The heat generated by the motor 2 is transferred to the terminal block 10 via the wires 12 with a high thermal conductivity. Accordingly, as the motor 2 is driven, the temperature of the terminal block 10 also increases.

In the terminal block 10, thermal stress is created between the case 11 and the terminals 22 in the case of a temperature increase due to a difference in coefficient of thermal expansion between the case 21 made of the resin and the terminals 22 made of the metal. Particularly, the partition walls 21b, 21c sandwiched between the terminals 22a and 22b and between the terminals 22b and 22c tend to be cracked due to thermal stress since the thermal stress is applied in a thickness direction by the terminals 22a, 22b and 22c. The occurrence of cracks leads to a reduction in insulation performance between the terminals 22 and a reduction in insulation reliability.

In the present embodiment, resin portions 40 which are plate-like members are provided between the terminals 22 and the partition walls 21b, 21c.

Specifically, the resin portion 40a formed of an insulating resin material different, from the resin material forming the partition wall 21b is provided between the terminal 22a and the partition wall 21b. The resin portion 40b formed of and made of the insulating resin material different from the resin material forming the partition wall 21b is provided between the terminal 22b and the partition wall 21b. The resin portion 40c formed of and made of the insulating resin material different from the resin, material forming the partition wall 21c is provided between the terminal 22b and the partition wall 21c. The resin portion 40d formed, of and made of the insulating resin material different from the resin material forming the partition wall 21c is provided between the terminal 22c and the partition wall 21c.

These resin portions 40 (40a, 40b, 40c and 40d) are arranged over contact surfaces of the terminals 22 and the partition walls 21b, 21c. The resin portions 40 buffer direct application of thermal stress created by thermal expansion and contraction of the terminals 22 to the partition walls 21b, 21c. Accordingly, the resin portions 40 are preferably made of a material with a higher plasticity (higher elasticity) than the partition walls 21b, 21c.

As just described, in the present embodiment, direct application of thermal stress due to thermal expansion and contraction of the terminals 22 to the partition walls 21b, 21c is buffered by interposing the resin portions 40 between the terminals 22 and the partition walls 21b, 21c. Even if the resin portions 40 are cracked due to thermal stress caused by thermal expansion and contraction, cracks remain in the resin portions 40 and do not extend to the interior of the partition walls 21b, 21c. This can prevent damages such as cracks in the partition wall 21b or 21c due to the thermal stress of the terminals 22 and prevent the deterioration of insulation reliability of the terminals 22.

Next, modifications of the present embodiment are described.

Figure 3:
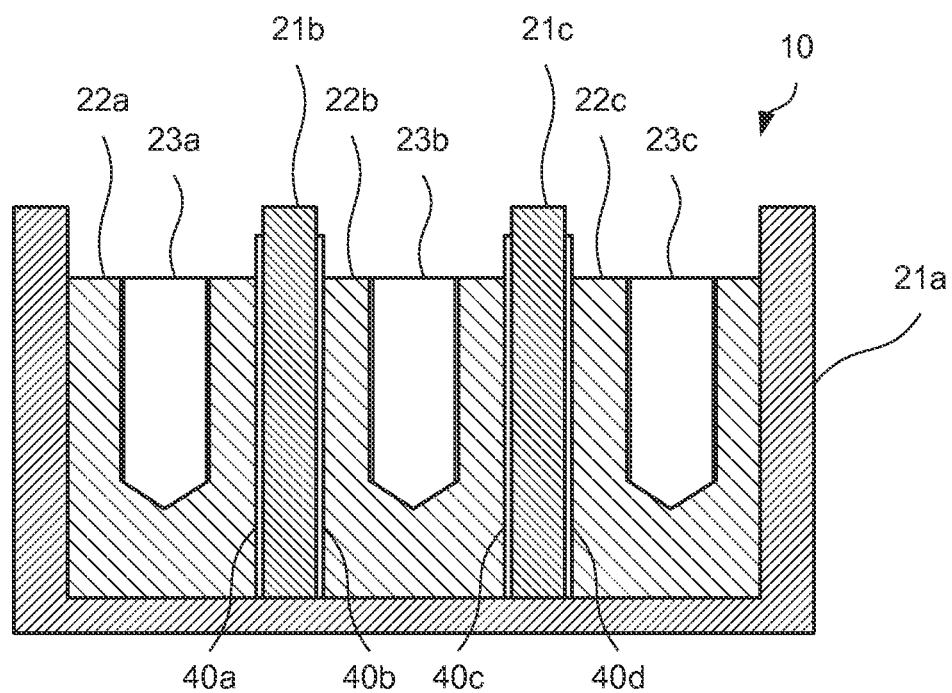
FIG. 3 is a diagram of a terminal block according to a modification of the embodiment of the present invention.

FIG. 3 is a sectional view along II-II of FIG. 2A showing a terminal block 10 according to a modification of the present embodiment.

In the modification shown in FIG. 3, the partition walls 21b, 21c are formed, separately from the box-shaped portion 21a.

More specifically, the partition walls 21b, 21c are mounted into the box-shaped portion 21a having a bottom surface and a surrounding erected wall to be in contact with the bottom surface and the erected wall of the box-shaped portion 21a. It is assumed that thicknesses of the partition walls 21b, 21c, i.e. creepage distances along which the partition walls 21b, 21c and the bottom surface of the case are in contact can ensure creepage distances necessary for the insulation of each of the terminals 22a, 22b and 22c.

By forming the partition walls 21b, 21c separately from the box-shaped portion 21a in this way, the partition walls 21b, 21c can move on the bottom surface of the box-shaped portion 21a in a sliding direction even if thermal stress created by thermal expansion and contraction of the terminals 22 is applied to the partition walls 21b, 21c. This can buffer application of the thermal stress to the partition walls 21b, 21c and prevent damages such as cracks in the partition wall 21b or 21c due to the thermal stress of the terminals 22. As a result, the deterioration of insulation reliability between the terminals 22 can be prevented in addition to the embodiment in which the resin portions 40 are only interposed between the terminals 22 and the partition walls 21b, 21c.

In the modification in FIG. 3, the partition walls 21b, 21c and the box-shaped portion 21a may be made of the same material or may be made of different materials. For example, the box-shaped portion 21a may be made of a resin material with a high thermal conductivity so as to radiate heat of the terminals 22 to the outside of the box-shaped portion 21a. In this case, since the resin material with a high thermal conductivity is possibly lower in strength than ordinary resin materials, only the bottom surface of the box-shaped portion 21a may be made of the resin material with a high thermal conductivity and the outer periphery of the box-shaped portion 21a may be made of a material with normal strength.

Figure 4A:
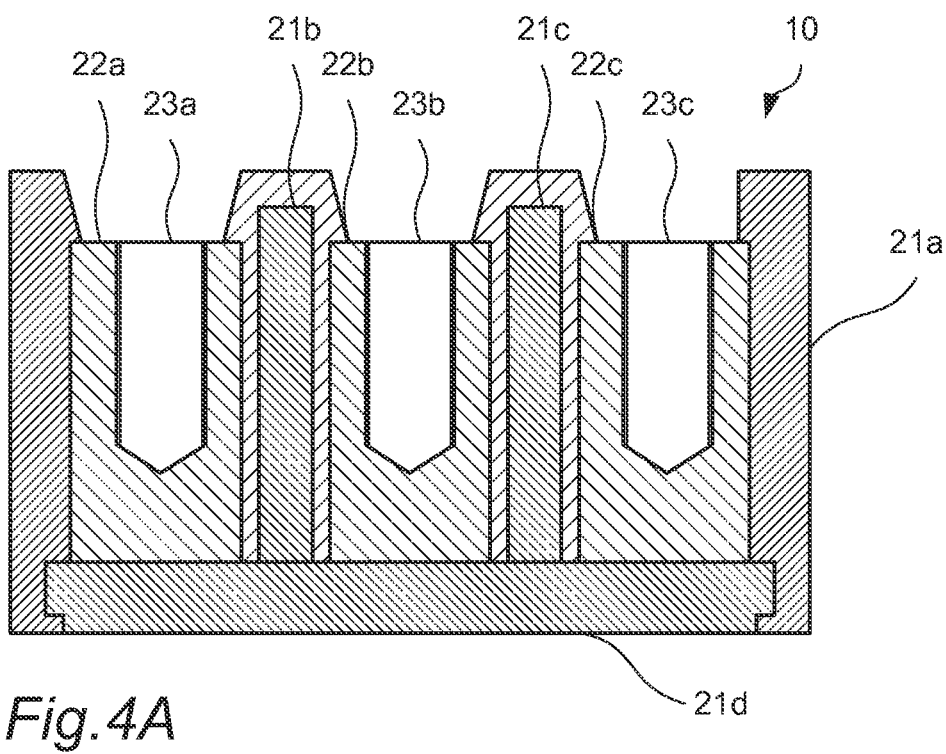
FIG. 4A is a diagram of a terminal block according to another modification of the embodiment of the present invention.
Figure 4B:
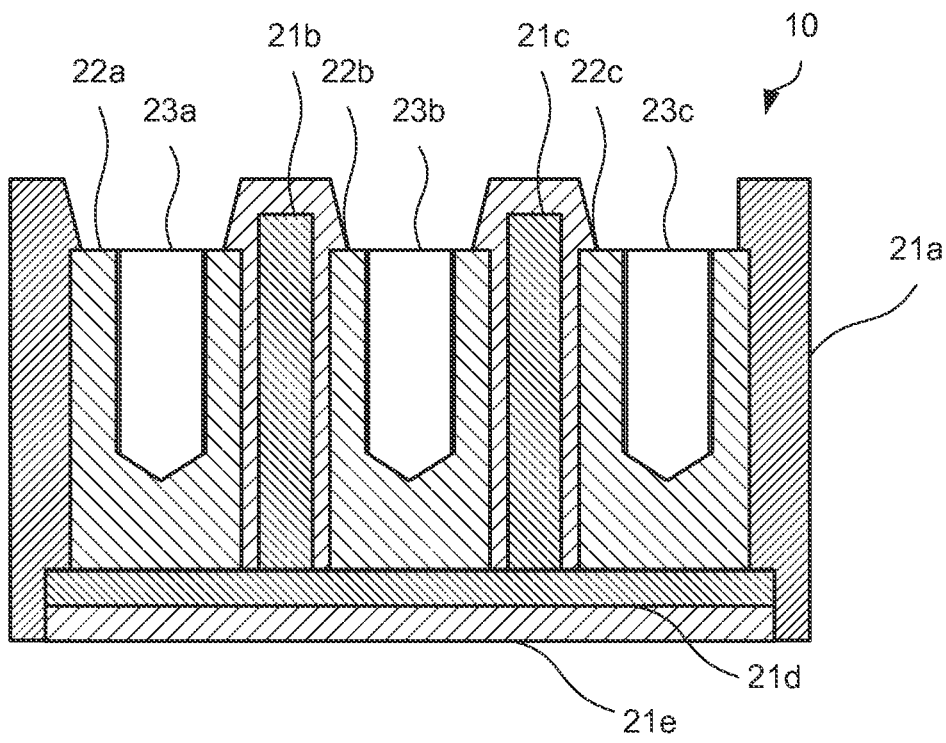
FIG. 4B is a diagram of a terminal block according to another modification of the embodiment of the present invention.

FIGS. 4A and 4B are sectional views along II-II of FIG. 2A showing a terminal block 10 according to another modification of the present embodiment.

In an example shown in FIG. 4A, the partition walls 21b, 21c and a bottom surface portion 21d are formed separately from the box-shaped portion 21a. The terminal block 10 is configured by molding these partition walls 21b, 21c and the bottom surface portion 21d into a resin member constituting the box-shaped portion 21a.

By such a configuration, constituent components of the terminal block 10 are integrally fixed. Specifically, by uniting the partition walls 21b, 21c, the bottom surface portion 21d and the terminals 22a, 22b and 22c, the formation of clearances between the constituent components can be prevented and thermal contact resistance can be reduced. This can radiate heat of the terminals 22 to the outside via the box-shaped portion 21a or the bottom surface portion 21d and suppress thermal stress caused by the terminals 22.

Since the partition walls 21b, 21c and the bottom surface portion 21d are integrally formed of the resin material, the partition walls 21b, 21c and the bottom surface portion 21d can be held in close contact to ensure insulation reliability.

Since the bottom surface portion 21d is separately formed, heat can be radiated from the bottom surface portion 21d to the outside of the case 21 by forming the bottom surface portion 21d of a resin material with a high thermal conductivity. Also in this case, the case 21 can be integrally formed to include the bottom surface portion 21d and a reduction in the strength of the case 21 can be suppressed.

To promote heat radiation from the bottom surface portion 21d, a heat radiation plate 21e made of a metal with a higher thermal conductivity may be provided on an outer peripheral side of the bottom surface portion 21d as shown in FIG. 4B. In this case, the bottom surface portion 21d can be stiffened by the heat radiation plate 21e.

Further, heat radiation may be promoted by allowing cooling water to run on an outer surface of the heat radiation plate 21e.

FIG. 5 are sectional views along II-II of FIG. 2A showing a terminal block 10 according to yet another modification of the present embodiment.

As described above, in the case of forming the partition walls 21b, 21c separately from the box-shaped portion 21a (or the bottom surface portion 21d), end parts 42a, 42b of the partition walls 21b, 21c may be inserted into groove portions 43a, 43b formed on the bottom surface of the box-shaped portion 21a to increase creepage distances of the partition walls 21b, 21c and the box-shaped portion 21a in order to ensure insulation reliability between the terminals 22. By such a configuration, the creepage distances between the terminals 22a and 22b and between the terminals 22b and 22c are increased along the shapes of the end parts 42a, 42b and the groove portions 43a, 43b, wherefore insulation reliability can be ensured.

Figure 5A:
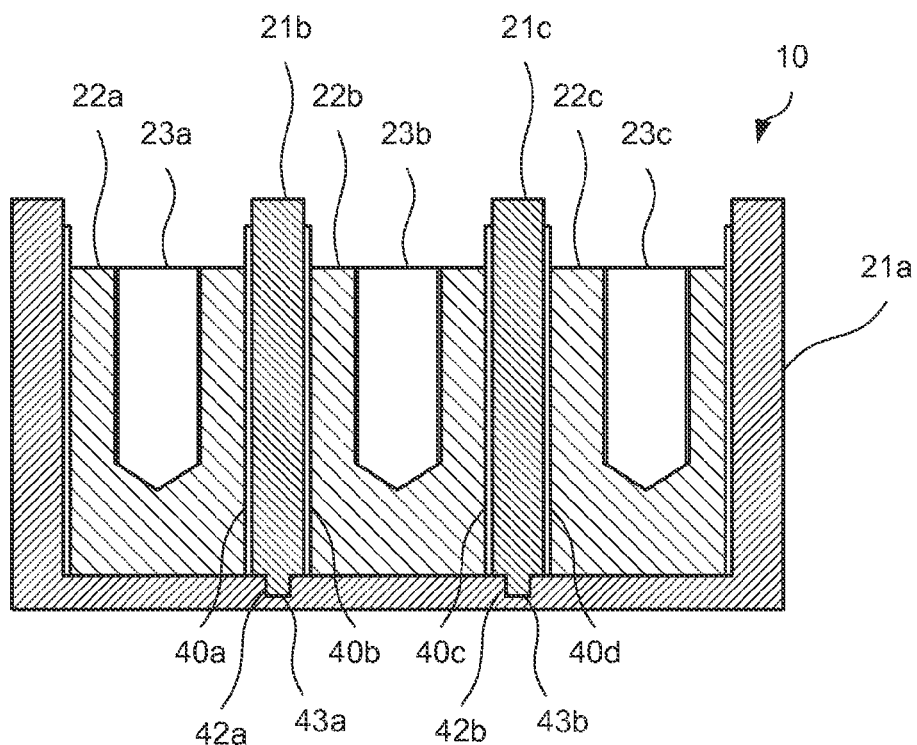
FIG. 5A is a diagram of a terminal block according to yet another modification of the embodiment of the present invention.
Figure 5B:
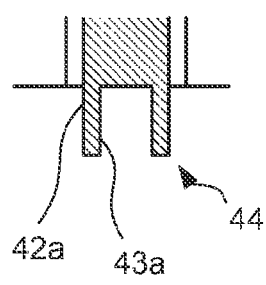
FIG. 5B is a diagram of a groove portion according to yet another modification of the embodiment of the present invention.
Figure 5C:
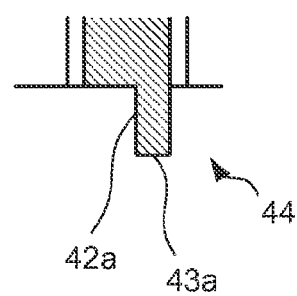
FIG. 5C is a diagram of a groove portion according to yet another modification of the embodiment of the present invention.
Figure 5D:
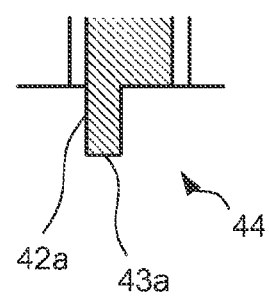
FIG. 5D is a diagram of a groove portion according to yet another modification of the embodiment of the present invention.

The groove portions 43a, 43b may be formed to be substantially equivalent to the thicknesses of the partition walls 21b, 21c or may be formed into key grooves 44 corresponding to the shapes of the end part 42a and end part 42b of the partition walls 21b, 21c as shown in FIGS. 5B, 5C and 5D. By forming them in this way, the creepage distances between the terminals 22 can be increased and insulation reliability can be ensured regardless of the thicknesses of the partition walls 21b, 21c.

Next, a manufacturing method of the terminal block 10 configured as described above is described.

Figure 6A:
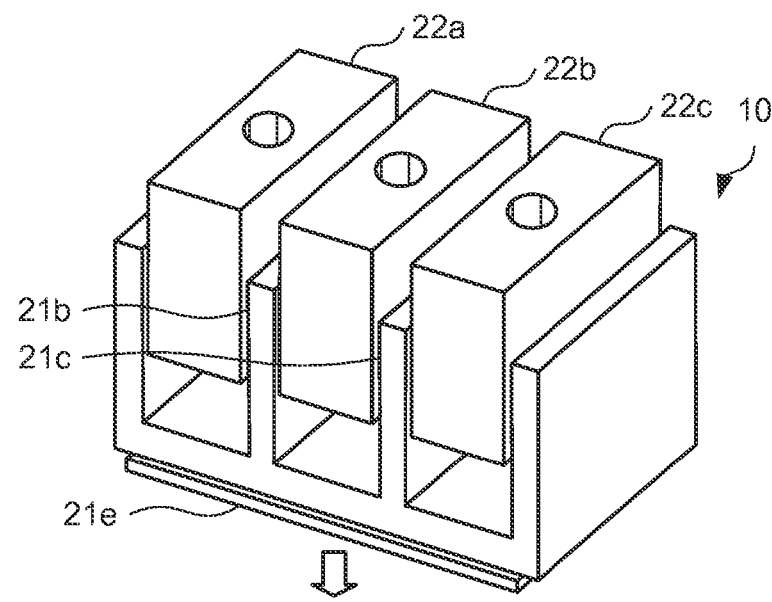
FIG. 6A is a diagram showing a manufacturing method of the terminal block of the embodiment of the present invention.
Figure 6B:
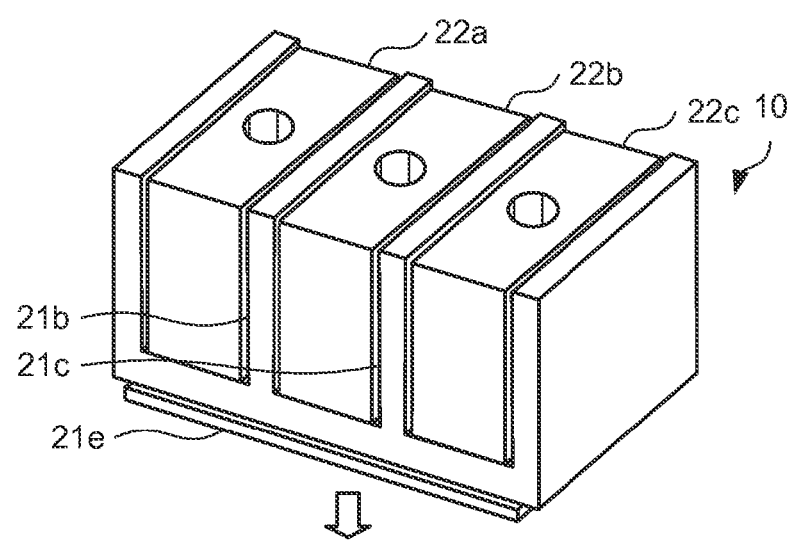
FIG. 6B is a diagram showing the manufacturing method of the terminal block of the embodiment of the present invention.
Figure 6C:
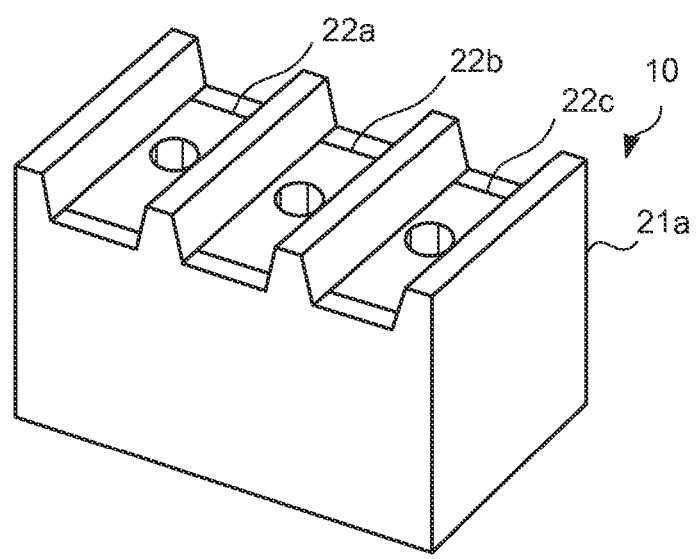
FIG. 6C is a diagram showing the manufacturing method of the terminal block of the embodiment of the present invention.

FIGS. 6A, 6B and 6C are diagrams showing the manufacturing method of the terminal block 10.

First, as shown in FIG. 6A, a comb-like first resin member made of an insulating resin and composed of the bottom surface portion 21d and the partition walls 21b, 21c is prepared. The first resin member is prepared by fixing the partition walls 21b, 21c and members, which become side walls of the box-shaped portion 21a, to the bottom surface portion 21d in advance by a method as shown in FIG. 5 described above. In this way, the first resin member having a comb-like shape is prepared. A resin material with a higher thermal conductivity than other parts is preferably used for the first resin member.

Subsequently, the terminals 22a, 22b and 22c are inserted into between the partition walls 21b, 21c of the first resin member (FIGS. 6A, 6B). At this time, the arrangement of the terminals 22a, 22b and 22c are so adjusted that predetermined clearances are formed between the partition walls 21b, 21c and the terminals 22a, 22b and 22c. In this way, the clearances into which a second resin member to be described later is to be mounted are formed between the partition walls 21b, 21c, the side walls and the terminals 22. The terminals 22 are brought into contact with a bottom surface part of the first resin member.

The heat radiation plate 21e is fixed to the outer peripheral side of the bottom surface portion 21d of the first resin member.

Subsequently, the first resin member in which the terminals 22 are mounted is molded with the second resin member made of an insulating resin different from the resin material forming the first resin member (FIG. 6C). A known technique such as vacuum molding or injection molding is used for the molding of the second resin member. The second resin member is filled into between the terminals 22 and the partition walls 21b, 21c to form the resin portions 40, which become the aforementioned plate-like members. Thus, a material with a higher plasticity (elasticity) than the first resin member is preferably used for the second resin member.

By this molding process, the second resin member integrally fixes the first resin member (box-shaped portion 21a, partition walls 21b, 21c and bottom surface portion 21d), the terminals 22 and the heat radiation plate 21e from outer sides.

The terminal block 10 is manufactured by such a procedure.

As described above, the terminal block 10 of the embodiment of the present invention is configured to electrically connect the wires 11 connected to the stator winding of the motor 2 and the wires 12 connected to the inverter 3, which is a power conversion device for supplying drive power of the motor 2. The terminal block 10 includes the case 21, a plurality of terminals 22 housed in the case 21 and connecting the wires 11, 12 to each other, the partition walls 21b, 21c for electrically isolating the plurality of terminals 22, and the resin portions 40 which are plate-like members provided between the partition walls 21b, 21c and the terminals 22 and made of the material with a higher elasticity than the case 21 and the partition walls 21b, 21c.

By such a configuration, direct application of the thermal stress of the terminals 22 to the partition walls 21b, 21c is buffered by the elasticity of the resin portions 40 which are plate-like members. This can prevent the partition walls 21b, 21c or the case 21 from being cracked or damaged and prevent the deterioration of insulation reliability of the terminals 22.

Even if the resin portions 40 are cracked due to thermal stress, cracks formed in the resin portions 40 do not extend to the partition walls 21b, 21c and the deterioration of insulation reliability of the terminals 22 can be prevented since the electrically insulating resin portions 40 and the partition walls 21b, 21c are separate members.

Since the resin portions 40 which are plate-like members are made of the material with a higher elasticity (plasticity) than the case 21 and the partition walls 21b, 21c, the resin portions 40 can prevent the partition walls 21b, 21c or the case 21 from being cracked or damaged due to the thermal stress of the terminals 22 and prevent the deterioration of insulation reliability of the terminals 22 by functioning as buffers.

Since the case 21 and the bottom surface portion 21d are separately formed, the bottom surface portion 21d can be, for example, made of a material with a higher thermal conductivity, heat of the terminals 22 can be radiated to the outside through the bottom surface portion 21d and thermal stress caused by the terminals 22 can be alleviated.

Since the partition walls 21b, 21c are formed separately from the bottom surface portion 21d, provided in close contact with the bottom surface portion 21d and erected from the bottom surface portion 21d, the partition walls 21b, 21c can move on the bottom surface portion 21d in the sliding direction when the thermal stress of the terminals 22 is applied. This can buffer the thermal stress caused by the terminals 22.

Since the heat radiation plate 21e made of the metal is provided in contact with the outer surface of the bottom surface portion 21d, heat of the terminals 22 can be radiated to the outside by the heat radiation plate 21e with a higher thermal conductivity than the bottom surface portion 21d and thermal stress caused by the terminals 22 can be alleviated.

Since the case 21 is formed by molding the terminals 22, the partition walls 21b, 21c and the resin portions 40, which are plate-like members, of the resin material, strength can be improved and insulation reliability of the terminals 22 can be enhanced by uniting these components.

Although the embodiment of the present invention has been described above, the above embodiment is only an illustration of an application example of the present invention and not intended to limit the technical scope of the present invention to the specific configuration of the above embodiment.

This application claims a priority of Japanese Patent Application No. 2011-227753 filed with the Japan Patent Office on Oct. 17, 2011, all the contents of which are hereby incorporated by reference.

Exclusive nature or features of the embodiments of this invention are claimed as follows.

The invention claimed is:

1. A terminal block for electrically connecting a plurality of first wires connected to an electric motor and a plurality of second wires connected to a power conversion device for supplying drive power of the electric motor, comprising:

a case made of a first resin material;
a plurality of terminals housed in the case and configured to connect the plurality of first wires and the plurality of second wires to each other;
a partition wall provided between the plurality of terminals to electrically isolate the plurality of terminals from each other; and
plate-like members provided between the partition wall and the terminals and made of a second resin material with a higher elasticity than material of the case and the partition wall made of the first resin material,
wherein the plate-like members are formed between the partition wall and the terminals by an integral molding of the case, the partition wall and the terminals with the second resin material.

2. The terminal block according to claim 1, wherein:
the partition wall is made of an electrically insulating material.

3. The terminal block according to claim 1, wherein:
the plate-like members are made of an electrically insulating material.

4. The terminal block according to claim 1, wherein:
the case is formed with a separate bottom surface portion, formed separately from other portions of the case, for supporting the terminals; and
the partition wall is formed separately from the bottom surface portion, held in close contact with the bottom surface portion and erected from the bottom surface portion.

5. The terminal block according to claim 4, wherein:
the bottom surface portion is made of a material with a higher thermal conductivity than other portions of the case.

6. The terminal block according to claim 4, wherein:
a heat radiation plate made of a metal is provided in contact with an outer surface of the bottom surface portion.

7. The terminal block according to claim 1, wherein:
the case is formed by molding the terminals, the partition wall and the plate-like members with the second resin material.

8. The terminal block according to claim 1, wherein the second resin material integrally fixes the case, the terminals, and the partition wall.

9. The terminal block according to claim 1, further comprising:
a second partition wall,
wherein the number of the plurality of terminals is three.

10. A method of manufacturing a terminal block for electrically connecting a plurality of first wires connected to an electric motor and a plurality of second wires connected to a power conversion device for supplying drive power of the electric motor, comprising:

housing a plurality of terminals in a case made of a first resin material, the plurality of terminals being configured to connect the plurality of first wires and the plurality of second wires to each other;
forming a partition wall between the terminals to electrically isolate the terminals from each other; and
integrally molding the case, the partition wall and the terminals with a second resin material to form plate-like members between the partition wall and the terminals, the second resin material having a higher elasticity than material of the case and the partition wall made of the first resin material.

11. The method according to claim 10, wherein:
the partition wall is made of an electrically insulating material.

12. The method according to claim 10, wherein:
the plate-like members are made of an electrically insulating material.

13. The method according to claim 10, wherein:
the case is formed with a separate bottom surface portion, formed separately from other portions of the case, for supporting the terminals; and
the partition wall is formed separately from the bottom surface portion, held in close contact with the bottom surface portion and erected from the bottom surface portion.

14. The method according to claim 13, wherein:
the bottom surface portion is made of a material with a higher thermal conductivity than other portions of the case.

15. The method according to claim 13, wherein:
a heat radiation plate made of a metal is provided in contact with an outer surface of the bottom surface portion.

16. The method according to claim 10, wherein:
the case is formed by molding the terminals, the partition wall and the plate-like members with the second resin material.

17. The method according to claim 10, wherein the second resin material integrally fixes the case, the terminals, and the partition wall.

* * * * *